Patented Sept. 9, 1924.

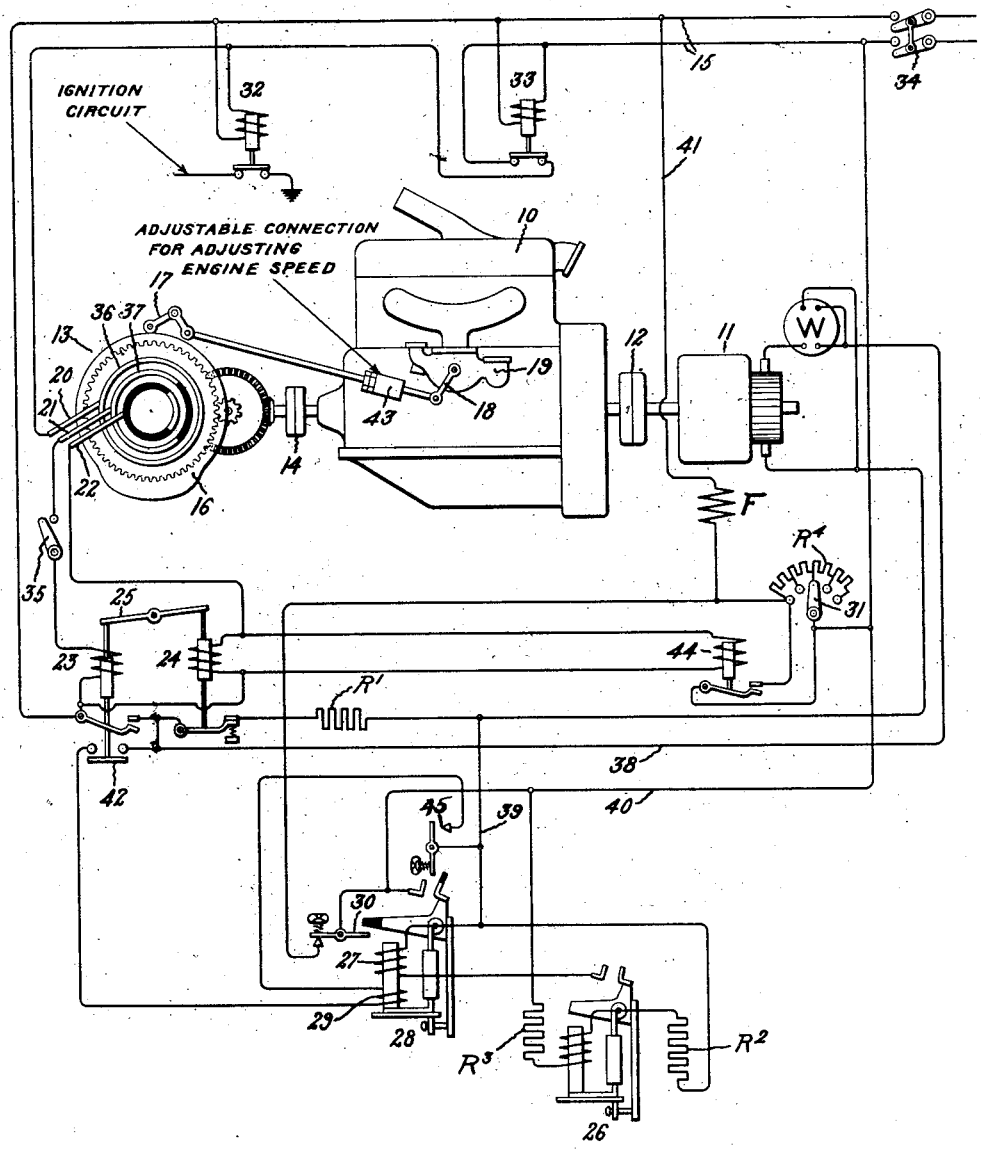

1,508,353

UNITED STATES PATENT OFFICE.

CARL F. SCOTT, OF YONKERS, NEW YORK, ASSIGNOR TO GENERAL ELECTRIC COMPANY, A CORPORATION OF NEW YORK.

ENGINE-TESTING DEVICE.

Application filed June 20, 1921. Serial No. 478,931.

*To all whom it may concern:*

Be it known that I, CARL F. SCOTT, a citizen of the United States, residing at Yonkers, in the county of Westchester, State of New York, have invented certain new and useful Improvements in Engine-Testing Devices, of which the following is a specification.

My invention relates to improvements in engine testing devices, and in particular to engine testing devices which function as dynamometers for loading the engines during test.

Although my invention has a particular application to the testing of engines for automotive vehicles, it is not necessarily limited thereto, but is applicable generally to the testing of prime movers.

In the testing of automotive vehicle engines preparatory to their assembly in the finished vehicle, it has been customary to load such engines by means of an electric brake which has the ability to produce a load within any limits of which the engine is capable, to operate the engine at a speed within the speed limits of the engine, to utilize the energy represented by the fuel consumed by transferring the mechanical power of the engine into electric power and using the latter to operate lights and motors in the manufacturing plant.

A testing system or device, in order to be efficient and practical, must incorporate a number of electric features which by their functioning with the whole apparatus will reproduce with more or less accuracy the working conditions to which the engine would be subjected in actual service. Thus, in actual service a vehicle engine must increase and decrease in speed according to the character of the roadway and the number of starts and stops, and must change from conditions of light load to conditions of heavy load.

Conditions of service further involve the automatic protection of the engine against overload and overspeed. Engines fitted with governors are so protected, but engines not fitted with governors are protected by the care of the driver. On the test stand, however, where one operator handles several machines, automatic protection against overspeed must be provided.

My invention provides an engine testing device, dynamometer or system, whereby the service conditions to which the engine is to be subjected are substantially reproduced. In carrying my invention into effect in one form, the engine in test is connected in any suitable manner to an electric dynamometer or dynamo electric machine which is adapted to be driven by the engine so as to furnish a load for the engine. The dynamo electric machine is controlled in such a manner that it may be connected to a supply circuit so as to operate as a motor to start the engine, and after the engine is started and is running under its own power, the dynamo electric machine operates as a generator to deliver energy to the supply circuit and thereby furnish a load for the engine. A timing mechanism is provided for varying the engine speed and also for controlling the dynamo electric machine, and the arrangement is such that after the engine has been started and is operating under its own power, the dynamo electric machine is connected to the supply circuit to deliver energy thereto when the engine speed is at a comparatively high value, and when the engine speed is reduced to a comparatively low value the dynamo electric machine is connected in a local dynamic brake circuit to furnish a load for the engine at low speed. When the engine is operated for a predetermined interval at the low speed with the dynamo electric machine included in the dynamic brake circuit, the machine is automatically connected to the supply circuit and the engine speed is increased. This cycle of operations is automatically repeated, thereby approximately reproducing the service conditions under which the engine is ordinarily operated. In case the power of the supply circuit should fail, the ignition circuit of the engine is automatically opened so as to thereby prevent the engine from obtaining a dangerous speed due to the removal of the load therefrom. The arrangement is also such that in case the power of the supply circuit should fail, the dynamo electric machine is automatically disconnected from the supply circuit, so that when the power of the supply circuit is resumed, the dynamo electric machine will operate as a motor to automatically start the engine and resume the above mentioned cycle of operations.

For a better understanding of my invention, reference is had to the accompanying drawing which shows one embodiment of my invention for purposes of illustration, and in which the engine 10 is connected to the dynamo electric machine 11 by means of a clutch or other suitable coupling 12, and the timing mechanism 13 is also suitably connected to the engine shaft by means of a coupling 14, and arranged so as to automatically vary the engine speed and to automatically regulate the load of the dynamo electric machine 11 as the engine speed is varied.

The dynamo electric machine is adapted to be connected to the source of supply 15 so as to operate either as a motor energized from the supply circuit to start the engine, or to operate as a generator delivering energy to the supply circuit. The timing mechanism 13 comprises a cam 16 which is driven from the engine through suitable reduction gearing, and cooperates with the pivoted arm 17 to thereby move the valve arm 18 of the carburetor 19 and thereby vary the engine speed. The cam disc 16 is also provided with three concentric rings with which the brushes 20, 21 and 22 are adapted to make engagement so as to thereby control the switch mechanism for controlling the dynamo electric machine 11. The dynamo electric machine is connected to the supply circuit by means of the electromagnetic switch or contactor 23, and the engine is adapted to be connected in a dynamic brake circuit, which includes the resistor $R^1$, by means of the contactor 24. The contactors 23 and 24 are mechanically interlocked by means of the pivoted bar 25, so that when the contactor 23 closes the contactor 24 is simultaneously opened.

The dynamo electric machine is first connected to the supply circuit through the resistors $R^2$ and $R^3$ to thereby limit the current taken by the machine at starting. When the current taken by the dynamo electric machine operating as a motor has decreased due to the speeding up of the machine the series contactor 26 automatically closes and thereby short circuits the resistor $R^2$ and simultaneously connects the series winding 27 of the series contactor 28 in circuit, so that when the current taken by the motor has again decreased due to speeding up, the contactor 28 automatically closes and short circuits the resistor $R^3$, connecting the motor directly across the supply circuit 15. The contactor 28 is maintained closed by means of the winding 29 which is connected across the armature of the dynamo electric machine so as to be energized in accordance with the counter or generated electromotive force of the machine. The contactor 28 in closing operates the auxiliary switch 30 to insert in the shunt field circuit F, the portion of the resistor $R^4$ determined by the setting of the switch member 31.

The wattmeter designated by the letter W is provided for registering the algebraic sum of the power supplied to or taken from the machine 11. The electromagnetic relay 32 has its winding connected across the supply circuit 15 and has its contact included in the ignition circuit of the engine, so that when the power of the supply circuit fails, the generated voltage of the machine increases and the ignition circuit is automatically opened and the engine stopped. The electromagnetic switch 33 has its winding connected across the supply circuit and its contacts are adapted to control the electric circuit to the dynamo electric machine 11, so that in case the power in the supply circuit should fail and the voltage of the dynamo-electric machine then suddenly rises, the dynamo electric machine will be automatically disconnected from the supply circuit, and the ignition circuit for the engine is automatically opened.

As thus constructed and arranged, and with the parts in the various positions shown in the drawing, the operation of my invention is as follows: In order to start the engine 10, the disconnecting switch 34 is first closed. The pilot switch 35 will now be closed, thereby energizing the line contactor 23 through a circuit including the brush 20, the conductive ring 36, the conductive segment 37, the brush 21, pilot switch 35, through the winding of the line contactor 23 to the other supply conductor. When the line switch 23 closes, the dynamo electric machine 11 is connected to the supply circuit 15 through a circuit including the upper or main contacts of the line switch 23, the conductor 38 through the armature of the dynamo electric machine, the conductor 39, the starting resistance $R^2$, the series winding of the series contactor 26, resistor $R^3$, through the conductor 40 to the other supply conductor. The shunt field F of the dynamo electric machine is connected to the supply circuit through the circuit including the conductor 41, the auxiliary switch 30 of the series contactor 28 through the conductor 40 to the other conductor of the supply circuit. When the line contactor 23 closed, the dynamic brake contactor 24 was automatically opened through the operation of the mechanical interlock 25. The dynamo electric machine will now operate as a motor to start the engine, and when the current taken by the motor has decreased due to the speeding up of the motor, the series contactor 26 will close and thereby short circuit the resistor $R^2$ and simultaneously include the series winding 27 of the contactor 28 in the motor armature circuit. When the current taken by the motor has again decreased due to the speeding up of the motor, the series contactor 28 will close and thereby short circuit the resistor $R^3$, connecting the armature of the dynamo electric machine directly across the supply circuit. The contactor 28 in closing automatically closes the auxiliary switch 45 and thereby connects the winding 29 of the contactor 28 across the armature terminals of the dynamo electric machine through a circuit including the auxiliary switch 42 of the line contactor 23, coil 29, auxiliary switch 45, to the other commutator brush of the dynamo electric machine. The contactor 28 will thereby be maintained closed responsively to the generated or counter electromotive force of the dynamo electric machine. The auxiliary switch 30 will be opened by the closing of the contactor 28 to thereby insert a portion of the resistor $R^4$ in the shunt field circuit of the machine. The engine 10 will now be operating under its own power and driving the dynamo electric machine 11 as a generator. The value of energy returned to the supply circuit may be varied by varying the position of the rheostat arm 31 to thereby include more or less of the resistor $R^4$ in the shunt field circuit of the dynamo electric machine. The speed of the engine may be varied at will by varying the adjustable connection 43 between the disc 16, the timing device 13, and the carburetor of the engine.

After the engine has driven the dynamo electric machine 11 as a generator for a certain number of revolutions, the disc 16 will be rotated so as to vary the position of the pivoted arm 17 and thereby vary the setting of the carburetor to automatically decrease the engine speed. Simultaneously with this decrease of the engine speed, the brush 21 will leave the conductive segment 37, thereby deenergizing the line contactor 23 to thereby disconnect the armature of the dynamo electric machine from the supply circuit 15. Simultaneously with the deenergizing of the line contactor 23, the dynamic brake contactor 24 is energized to close and thereby connect the armature of the dynamo electric machine in the dynamic brake circuit which includes the resistor $R^1$. The electromagnetic switch or contactor 44 is energized simultaneously with the energization of the dynamic brake contactor 24 to thereby short circuit the portion of the resistor $R^4$ which had been included in the circuit of the shunt field F of the machine to thereby cause the dynamo electric machine to operate with full field during the dynamic brake portion of the cycle of operations. After the engine has operated at the low speed for a predetermined number of revolutions, the engine speed is increased through the operation of the cam disc 16 in controlling the carburetor of the engine, and simultaneously with the increase of the engine speed, the dynamic brake contactor 24 is deenergized; the field resistor contactor 44 is also deenergized to insert resistance in the field circuit of the machine, and the line contactor 23 is energized to connect the armature of the machine to the source of supply to operate as a generator delivering energy to the supply circuit.

By reason of the fact that the series contactor 28 is maintained closed by means of the winding 29 which is energized in accordance with the generated potential of the dynamo electric machine, if desired, the arrangement may be such that the resistors $R^2$ and $R^3$ may be reinserted in the armature circuit of the machine preparatory to connecting the machine to the supply circuit, or, if desired, the contactor 28 may be maintained closed by means of the winding 29 until either the pilot switch 35 is opened to stop the equipment or the voltage of the supply circuit fails. In case the voltage of the supply circuit should fail, the voltage of the machine 11 will increase greatly and the relay 32 will operate to open up the ignition circuit of the engine and thereby cause the engine to stop and the electromagnetic switch 33 will open its contacts and thereby cause the dynamo electric machine to be disconnected from the supply circuit and all of the switches to resume their respective positions shown in the drawing preparatory to again starting the equipment after the power of the supply circuit has been resumed.

It will be seen from the above that I have provided an arrangement for testing prime movers which substantially duplicates the service conditions encountered by the prime mover. The engine is operated at a maximum speed similar to that ordinarly encountered in service, the engine is caused to drive a load which may be varied, and the engine speed is varied and the load maintained while the engine is operated at the minimum speed. Furthermore, the engine is protected in case the supply circuit should fail.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. An engine testing device comprising a dynamo electric machine adapted to be driven by the engine to operate as a generator and thereby furnish a load for the engine, and timing mechanism for automatically varying the engine speed and for automatically regulating the load of the said machine as the engine speed is varied.

2. An engine testing device comprising a dynamo electric machine adapted to be driven by the engine to operate as a generator and thereby furnish a load for the engine, and means operated synchronously with the operation of the engine for varying the engine speed and automatically regulating the load of the said machine as the engine speed is varied.

3. An engine testing device comprising a dynamo electric machine adapted to be driven as a generator by the engine to furnish a load for the engine and adapted to be connected to a source of supply to operate as a motor to drive the engine, and timing mechanism for periodically connecting the said machine to the source of supply and disconnecting the same therefrom.

4. An engine testing device comprising a dynamo electric machine adapted to be driven as a generator by the engine to furnish a load for the engine and adapted to be connected to a source of supply to operate as a motor to start the engine, and timing mechanism for periodically varying the speed of the engine and for simultaneously controlling the connection of the said machine to the source of supply.

5. An engine testing device comprising a dynamo electric machine adapted to be driven by the engine and adapted to be connected to a source of supply to operate as a generator to furnish a load for the engine, and means operated synchronously with the operation of the engine for varying the engine speed and for controlling the connection of the said machine to the source of supply.

6. An engine testing device comprising a dynamo electric machine adapted to be driven by the engine and adapted to be connected to a source of supply to operate as a generator to furnish a load for the engine, means operated synchronously with the operation of the engine for periodically varying the engine speed, and means operated responsively to the speed of the engine for controlling the connection of the said machine to the source of supply.

7. An engine testing device comprising a dynamo electric machine adapted to be driven as a generator by the engine and adapted to be connected in a dynamic brake circuit to furnish a load for the engine, and means operated synchronously with the operation of the engine for varying the engine speed and for controlling the connection of the said machine in the said dynamic brake circuit.

8. An engine testing device comprising a dynamo electric machine adapted to be driven as a generator by the engine and adapted to be connected in a dynamic brake circuit to furnish a load for the engine, means operated synchronously with the operation of the engine for periodically varying the operation of the engine speed, and means operated synchronously with the engine for controlling the connection of the said machine in the said dynamic brake circuit.

9. An engine testing device comprising a dynamo electric machine adapted to be connected to the engine, timing mechanism for controlling the said machine, a supply circuit, a dynamic brake circuit, and means whereby the said machine is alternately connected to the said supply circuit and in the said dynamic brake circuit under the control of the said timing mechanism.

10. An engine testing device comprising a dynamo electric machine adapted to be connected to the engine, timing mechanism for varying the engine speed, and for controlling said machine, a supply circuit, a dynamic brake circuit, and means whereby the said machine is caused to deliver energy to the said supply circuit when the engine speed is one value and the said machine is included in the said dynamic brake circuit when the engine speed is another value.

11. An engine testing device comprising a dynamo electric machine adapted to be connected to the engine, timing mechanism for varying the engine speed and for controlling said machine, a supply circuit, a dynamic brake circuit, and means controlled by the said timing mechanism whereby the said machine is energized from the said supply circuit as a motor to start the engine and the machine then operates as a generator delivering energy to the supply circuit when the engine speed is one value and the machine is included in the dynamic brake circuit when the engine speed is another value.

In witness whereof, I have hereunto set my hand this 16th day of June, 1921.

CARL F. SCOTT.